(12) United States Patent
Larsen (10) Patent No.: US 12,284,416 B2
(45) Date of Patent: Apr. 22, 2025

(54) METHOD AND DEVICE FOR ADAPTIVE PLAYOUT OF MEDIA CONTENT

(71) Applicant: Dolby International AB, Amsterdam (NL)

(72) Inventor: Jonas Moeller Larsen, Erlangen (DE)

(73) Assignee: Dolby International AB, Dublin (IE)

( * ) Notice: Subject to any disclaimer, the term of this patent is extended or adjusted under 35 U.S.C. 154(b) by 0 days.

(21) Appl. No.: 17/797,569

(22) PCT Filed: Feb. 1, 2021

(86) PCT No.: PCT/EP2021/052289
§ 371 (c)(1),
(2) Date: Aug. 4, 2022

(87) PCT Pub. No.: WO2021/156194
PCT Pub. Date: Aug. 12, 2021

(65) Prior Publication Data
US 2023/0059063 A1  Feb. 23, 2023

Related U.S. Application Data

(60) Provisional application No. 62/969,817, filed on Feb. 4, 2020.

(30) Foreign Application Priority Data

Feb. 4, 2020  (EP) ..................................... 20155381

(51) Int. Cl.
*H04N 21/4402* (2011.01)
*H04N 21/845* (2011.01)

(52) U.S. Cl.
CPC . *H04N 21/440245* (2013.01); *H04N 21/8456* (2013.01)

(58) Field of Classification Search
CPC .................. H04N 21/440245; H04N 21/8456
See application file for complete search history.

(56) References Cited

U.S. PATENT DOCUMENTS 9,386,058 B2   7/2016  Gao
10,432,686 B1 * 10/2019 Wu ........................ H04L 67/06
(Continued)

FOREIGN PATENT DOCUMENTS

CN    102055717 A   5/2011
CN    102356605 A   2/2012
(Continued)

OTHER PUBLICATIONS

Jian Wu, Principles and Applications of Streaming Media Technology, Mar. 30, 2005, 5 pages, Journal of Taiyuan University, Taiyuan, CN.

*Primary Examiner* — Randy A Flynn (57) ABSTRACT

Described herein is a method for controlling media data playout on a client device, wherein the method includes the steps of: (a) retrieving, by the client device, media data comprising a plurality of segments subdivided into one or more chunks for playout from at least one media server; (b) analyzing a current chunk of the one or more chunks of a current segment; and (c) adapting the playout of the media data in response to the result of the analysis prior to fully retrieving the current chunk. Described herein are further a client device having implemented a media player application configured to perform said method and a computer program product with instructions adapted to cause a device having processing capability to carry out said method.

16 Claims, 5 Drawing Sheets

(56) References Cited

U.S. PATENT DOCUMENTS

| | | |
|---|---|---|
| 2003/0235217 A1 | 12/2003 | Verreault |
| 2004/0044783 A1* | 3/2004 | Nordberg ............... H04L 47/30 709/231 |
| 2005/0232290 A1 | 10/2005 | Mathew |
| 2010/0158101 A1 | 6/2010 | Wu |
| 2013/0129317 A1* | 5/2013 | Moorer ............. H04N 21/8456 386/241 |
| 2013/0308638 A1 | 11/2013 | Grossman |
| 2016/0277466 A1 | 9/2016 | Lohmar |
| 2017/0086250 A1* | 3/2017 | Singh ..................... H04L 65/80 |
| 2017/0171577 A1 | 6/2017 | Kipp |
| 2017/0188060 A1 | 6/2017 | Major |
| 2017/0188072 A1* | 6/2017 | Major .................. H04N 21/237 |
| 2017/0195393 A1 | 7/2017 | Su |
| 2017/0280178 A1 | 9/2017 | Sun |
| 2018/0027039 A1 | 1/2018 | Moorthy |
| 2018/0199075 A1* | 7/2018 | Wang ............... H04N 21/64322 |
| 2018/0367844 A1* | 12/2018 | Fu ................... H04N 21/44004 |

FOREIGN PATENT DOCUMENTS

| | | |
|---|---|---|
| CN | 103051955 A | 4/2013 |
| CN | 104022845 A | 9/2014 |
| CN | 104471955 A | 3/2015 |
| CN | 105075276 A | 11/2015 |
| CN | 105594182 A | 5/2016 |
| CN | 107454458 A | 12/2017 |
| CN | 108023864 A | 5/2018 |
| CN | 108370281 A | 8/2018 |
| CN | 108462899 A | 8/2018 |
| CN | 108600784 A | 9/2018 |
| CN | 110087109 A | 8/2019 |
| EP | 3391652 B1 | 7/2020 |
| EP | 3179732 B1 | 5/2022 |
| WO | 2001053962 A1 | 7/2001 |
| WO | 2005046133 A1 | 5/2005 |
| WO | 2017102713 A1 | 6/2017 |

* cited by examiner

METHOD AND DEVICE FOR ADAPTIVE PLAYOUT OF MEDIA CONTENT

CROSS-REFERENCE TO RELATED APPLICATIONS

This application claims priority of the following priority applications: U.S. provisional application 62/969,817 (reference: D18115USP1), filed 4 Feb. 2020 and EP application 20155381.5 (reference: D18115EP), filed 4 Feb. 2020, which are hereby incorporated by reference.

TECHNOLOGY

The present disclosure relates generally to a method for controlling media data playout on a client device, and more specifically to adapting the playout of media data in response to a result of an analysis of a current chunk prior to fully retrieving said current chunk.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

The hypertext transfer protocol (HTTP) represents an example of a standardized protocol being used for streaming of media content via the Internet. For example, in HTTP Adaptive Streaming (HAS), two formats may be used, the HTTP live streaming (HLS) format implemented by Apple and the MPEG DASH format. Both formats, however, add latency to a live stream.

To reduce latency, when streaming, for example, live media content from a server to a client, traditional streaming clients usually wait until a full media segment is retrieved before deciding to eventually adjust a download quality and/or a playout rate. A different approach in reducing latency is the application of chunked transfer encoding. In chunked transfer encoding, media data in a stream are represented as segments subdivided into non-overlapping chunks. The one or more chunks are transmitted and received independently of one another. In other words, no knowledge of the media data stream apart from the currently-being-processed (current) chunk is required for both sender and receiver at any given time.

A media data container developed in the context of chunked transfer encoding is the CMAF (common media application format) container format which can be applied with both HAS formats, HLS and MPEG DASH. The CMAF container format implements a lower latency mode compared to traditional streaming approaches.

However, there is still an existing need for methods and devices that allow a streaming client's playback mechanism to adjust playout of streamed media content in a more efficient manner to reach a better compromise between coding efficiency, absolute latency and playout stability.

SUMMARY

In accordance with a first aspect of the present disclosure there is provided a method for controlling media data playout on a client device. The method may include the step of (a) retrieving, by the client device, media data comprising a plurality of segments subdivided into one or more chunks for playout from at least one media server. The method may further include the step of (b) analyzing a current chunk of the one or more chunks of a current segment. And the method may include the step of (c) adapting the playout of the media data in response to the result of the analysis prior to fully retrieving the current chunk Configured as above, the method described allows a streaming client's playback mechanism to adapt the playout of media data already before a media data segment or a chunk, such as a CMAF chunk, for example, has been fully retrieved. The absolute latency experienced by a consumer of the streamed media content can thus efficiently be reduced as the information required for playout adaption is already available to the streaming client before the media data segment or the chunk has been fully retrieved (downloaded).

In some embodiments, each of the one or more chunks may comprise at least two IP packets, and analyzing the current chunk in step (b) and adapting the playout of the media data in step (c) may be performed prior to fully retrieving the at least two IP packets within the current chunk.

In some embodiments, analyzing the current chunk in step (b) may include analyzing at least a first one of the at least two IP packets within the current chunk.

In the context of HTTP/TCP/IP streaming, the size of a media data segment or a chunk is generally indicated in the first (few) IP-packets. Configured as above, the information on the size of a media data segment or of a chunk is thus already available to the streaming client before the media data segment or the chunk has been fully retrieved (downloaded). For example, depending on a determined size of the media data segment or the chunk, the client's playback mechanism can then, for example, reduce or increase its playout rate.

In accordance with a second aspect of the present disclosure there is provided a client device having implemented a media player application configured to perform the method for controlling media data playout on a client device.

In accordance with a third aspect of the present disclosure there is provided a computer program product with instructions adapted to cause a device having processing capability to carry out the method for controlling media data playout on a client device.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Adaptive Playout of Media Content

Methods and devices as described herein enable a streaming client's playback mechanism to adjust playout of media data depending, for example, on the size (e.g. in bytes) of a currently incoming media data segment or an incoming chunk of the media data segment, already before the media data segment or the chunk, such as a CMAF chunk, has been fully retrieved. End-to-end latency (absolute latency), including pre-roll delay, experienced by a consumer of the streamed media content can thus efficiently be reduced.

In the context of HTTP/TCP/IP streaming, the size of a media data segment or of a chunk is generally indicated in the first (few) IP-packets. Thus, the information on the size of the full media data segment or of the chunk is already available to the streaming client before the media data segment or the chunk has been fully retrieved (downloaded). For example, in case the size of the media data segment being retrieved would be larger than average (defined as the nominal download rate in kbps multiplied by the duration of the media data segment), the client's playback mechanism can reduce, for example, its playout rate to reduce the risk of rebuffering events caused by an empty jitter buffer. In case the size of the media data segment being retrieved would be smaller than average, the client's playback mechanism can, for example, increase its playout rate.

Chunked Transfer Encoding

As already stated above, CMAF (common media application format) is a container format developed in the context of chunked transfer encoding that may be used in conjunction with either the HLS or the MPEG DASH format in HTTP Adaptive Streaming (HAS) applications. In applying the CMAF container format, each media data segment may be subdivided into chunks allowing the playout of media content to start earlier. With CMAF, the streaming client may only wait until a full chunk is retrieved before deciding to eventually adjust a download quality and/or a playout rate. The application of the CMAF container format is, however, on the expense of an increased segment size in kB as a separate header is required to initialize the playback of the chunks at the streaming client side. While thus latency introduced by the encoding and transmission of media data may be reduced, due to the increased segment size, latency may, however, be added at the streaming client side.

Figure 1:
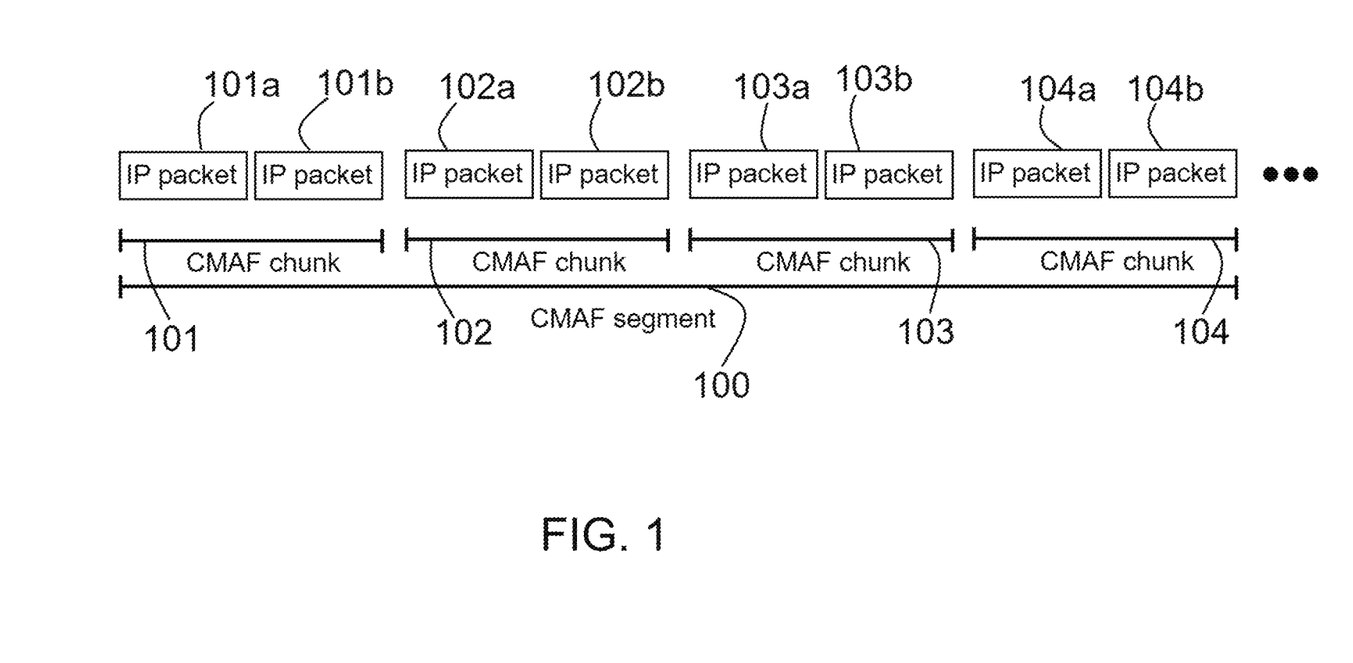
FIG. 1 illustrates an example of a CMAF (common media application format) segment subdivided into chunks which comprise IP packets.

In FIG. 1, an example of a media data segment subdivided into CMAF chunks is illustrated. In this example, the media data segment, 100, is subdivided into 4 CMAF chunks, 101, 102, 103, 104. Each of the 4 CMAF chunks, 101, 102, 103, 104, comprises two IP packets, 101a, 101b, 102a, 102b, 103a, 103b, 104a, 104b. Each chunk, 101, 102, 103, 104, may be output by an encoder immediately after encoding and transmitted to a streaming client.

In the following, methods and devices for controlling media data playout on a client device will be described. The methods and devices allow to adjust the playout of the streamed media content in a more efficient manner to reach a better compromise between coding efficiency, absolute latency and playout stability.

Method for Controlling Media Data Playout on a Client Device

Figure 2:
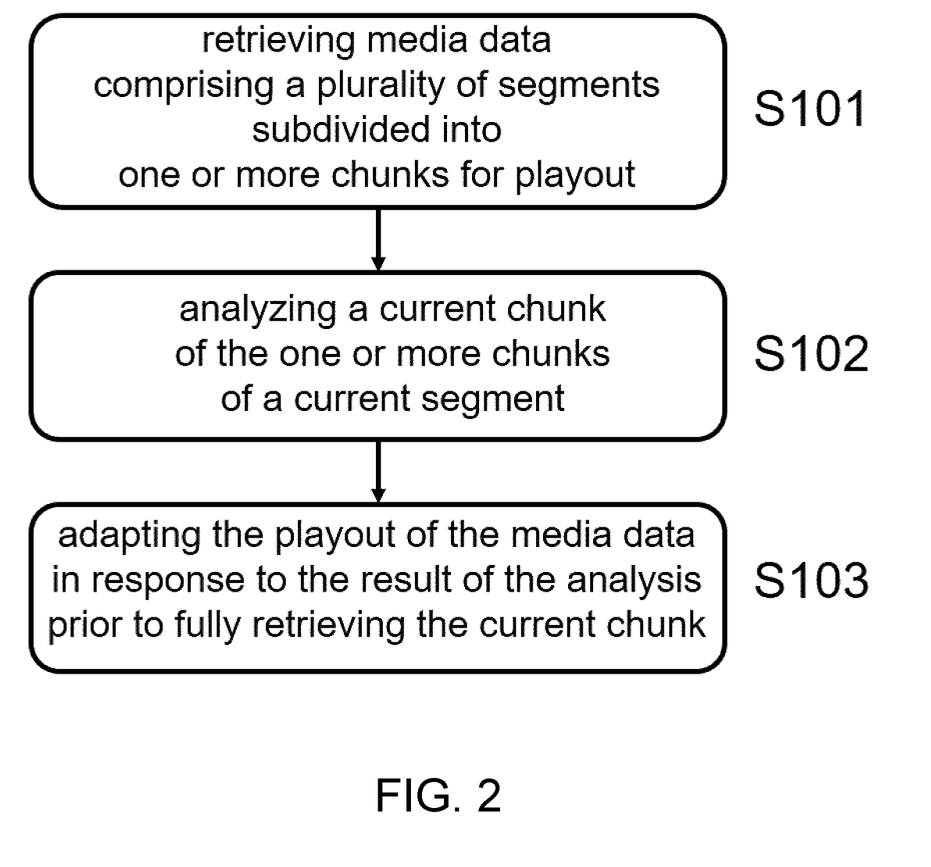
FIG. 2 illustrates a flow diagram of an example of a method for controlling media data playout on a client device.

Referring to FIG. 2, a flow diagram of an example of a method for controlling media data playout on a client device is illustrated. In step S101, media data comprising a plurality of segments subdivided into one or more chunks are retrieved for playout by a client device from at least one media server.

It is noted that a segment may thus either be equivalent to a single chunk, i.e. may not be subdivided any further, or may comprise two or more chunks. In the following, as the former case is concerned, the terms "chunk" and "segment" may be used interchangeably.

The term "chunk" as used herein refers to the context of chunked transfer encoding including the CMAF container format as described above, wherein a data stream may be subdivided into a series of non-overlapping chunks.

While retrieving the media data for playout from at least one media server may encompass both streaming on demand and live streaming, in an embodiment, retrieving the media data for playout in step S101 may include live streaming, for example, HTTP Adaptive Streaming.

In step S102, a current chunk of the one or more chunks of a current segment is analyzed. The term "current chunk" refers to a chunk currently being processed/retrieved (incoming chunk) by a streaming client device. The term "current chunk" thus refers to a chunk that has not yet been fully retrieved (downloaded). As already stated above, a chunk may further be equivalent to a media data segment which has not been subdivided any further. In this case, in step S102 it may thus also be said that a current segment is analyzed.

In an embodiment, analyzing the current chunk (current segment) in step S102 may include analyzing a size of the current chunk (current segment). While the performance of the analysis is not limited as long as the size of the current chunk may be determined, in an embodiment, analyzing the size of the current chunk may be performed by analyzing a header of the current chunk. In this, the size of the current chunk is available to the playback mechanism of the streaming client device already before the incoming chunk has been fully retrieved (downloaded).

In step S103, in response to the result of the analysis in step S102, the playout of the media data is adapted prior to fully retrieving the current chunk. Consequently, already before an incoming chunk (segment) is fully downloaded, the playback mechanism of the streaming client device can adapt the playout of the media data contained in the incoming chunk. This enables to significantly reduce causes at the streaming client side such as jitter buffers running empty or buffer overflow that contribute to the absolute latency. For example, the size of a jitter buffer may be dynamically adapted by the streaming client's playback mechanism depending on the determined size of the current chunk to reduce the added latency and to prevent buffer overflow or underflow.

In an embodiment, adapting the playout of the media data prior to fully retrieving the current chunk in step S103 in response to the result of the analysis in step S102 may be based on one or more playout conditions. The one or more playout conditions may include one or more of network conditions indicative of a state of a network used for retrieving the media data and client conditions indicative of a state of the client device.

In an embodiment, the network conditions may include an available network bandwidth. In adaptive streaming, a streaming client is typically provided with different bitrate representations of the same media content from which it may select. Adaptive streaming generally enables a streaming client to select a bitrate representation that is higher than the available network bandwidth would allow as the streaming client may account for this by adapting the playout speed, for example, by changing frame periods during playout. Analyzing the current chunk in step S102 thus allows a streaming client to adapt the playout of the media data in response based on the available network bandwidth already before the current chunk has been fully downloaded.

In an embodiment, the client conditions may include a state of a jitter buffer of the client device. For example, a state of a jitter buffer may refer to a currently available free memory including rewritable memory. In other words, a state of the jitter buffer with regard to overflow, underflow or pre-roll delay. The state of the jitter buffer may further also encompass the buffer backlog. Analyzing the current chunk in step S102 thus allows a streaming client to adapt the playout of the media data based on the state of the jitter buffer already before the current chunk has been fully downloaded. For example, if in step S102 the size of a current chunk is determined, in response, the streaming client may increase the playout speed if it is determined that the jitter buffer is in a state close to buffer overflow or may reduce the playout speed if it is determined that the jitter buffer is in a state close to buffer underflow. Depending on the determined size of the current chunk, the streaming client's playback mechanism may further estimate the buffer pre-roll delay and/or the buffer backlog capacity already before the current chunk has been downloaded.

Alternatively, or additionally, in an embodiment, in step S103 adapting the playout of the media data prior to fully retrieving the current chunk may include adapting a media quality and/or a playout rate.

Adapting the media quality may include changing a bitrate of a download process or streaming process for retrieving the media data. For example, a streaming client may switch the media quality at segment boundaries.

In an embodiment, adapting the playout rate may include increasing or decreasing a playout speed. As already mentioned above, the playout speed may be increased or decreased by changing frame periods during playout, for example, decreasing from 30 fps to 28 fps.

In an embodiment, the playout speed may be increased if it is analyzed that the size of the current chunk is small and/or a latency (absolute latency) of media data that are currently played out is above a given threshold.

For example, if it is determined during the analysis step that small chunks are to be retrieved during live streaming, the playback mechanism of the client device may react already before a current chunk has been fully downloaded by increasing the playout speed. In this, buffer overflow may be readily avoided as the download time for small chunks is comparably short depending, however, on the network connection.

Moreover, if it is determined that a latency of the media data that are currently played out is above a given threshold, for example, the latency of the media data currently played out may be above is (which may be perceptible for a user/consumer), wherein the live stream is ahead of the played out media data, the streaming client's playback mechanism may increase the playout speed for a current chunk even before the current chunk has been fully downloaded in order to compensate for the latency.

Alternatively, or additionally, in an embodiment, the playout speed may be decreased if it is analyzed that the size of the current chunk is large and/or a latency (absolute latency) of media data that are currently played out is below a given threshold.

For example, if it is determined during the analysis step that large chunks are to be retrieved during live streaming, the playback mechanism of the client device may react already before a current chunk has been fully downloaded by decreasing the playout speed. In this, jitter buffer underflow and rebuffering may be readily avoided as the download time for large chunks is comparably long depending, however, on the network connection and the buffer may be in a risk of running empty if the buffered media data are played out before a subsequent chunk has been downloaded to the jitter buffer.

Moreover, if it is determined that a latency of media data that are currently played out is below a given threshold, for example, the latency of the media data currently played out is above 1 s, wherein the live stream is running behind the played out media data, the streaming client's playback mechanism may decrease the playout speed for a current chunk even before the current chunk has been fully downloaded in order to compensate for the latency. In an embodiment, increasing or decreasing the playout speed may result in an average playout speed of 1.0 (nominal playout speed).

The playout speed may further only be varied as such that a user (consumer) currently consuming the media data being played out may not recognize the change. In an embodiment, the playout speed may be increased or decreased by up to 20%. A variation in playout speed up to 20% was found not to be perceptible by a user. In an embodiment, the playout speed may, however, be increased or decreased by up to 10%.

Figure 3:
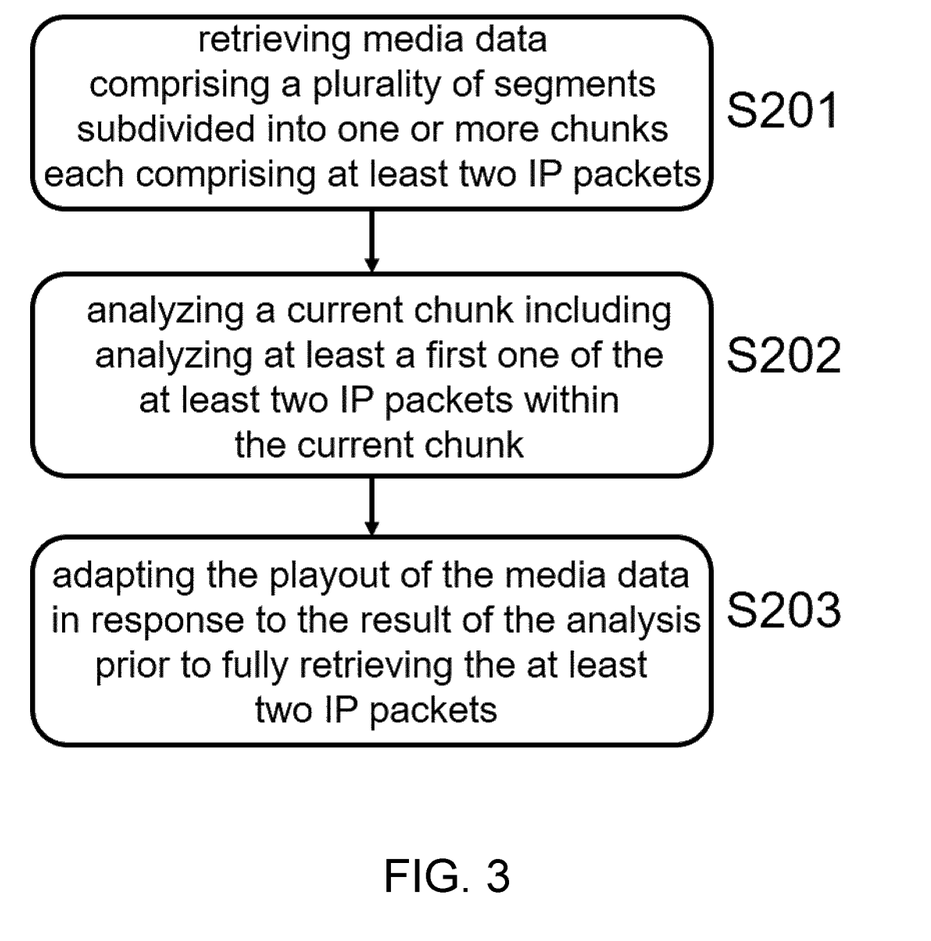
FIG. 3 illustrates a flow diagram of another example of a method for controlling media data playout on a client device.

Referring now to FIG. 3, a flow diagram of another example of a method for controlling media data playout on a client device is illustrated. In step S201, in an embodiment, media data comprising a plurality of segments subdivided into one or more chunks are retrieved for playout by a client device from at least one media server, wherein each of the one or more chunks may comprise at least two IP packets. In general, an IP packet may comprise at least a header and payload. The header may comprise fixed and optional fields. As already mentioned above, a segment may be equivalent to a single chunk, if it is not subdivided any further. In this case, the segment may comprise the at least two IP packets.

In an embodiment, in step S202, analyzing the current chunk may include analyzing at least a first one of the at least two IP packets within the current chunk.

The size of a current chunk may be indicated already in the first IP packet, for example, in the header of the IP packet. Analyzing the size of the current chunk may thus be performed by analyzing the first one of the IP packets, more specifically by analyzing the header of the first one of the IP packets.

Referring again to the example of FIG. 3, in step S202, analyzing the current chunk and in step S203 adapting the playout of the media data in response to the result of the analysis in step S202 may then be performed prior to fully retrieving the at least two IP packets. In other words, only a part of the current chunk, i.e. the first IP packet, may be retrieved for the analysis in step S202 to enable the client device to adapt the playout of the media data in response to the result of the analysis prior to fully retrieving the current chunk.

It is to be noted that the measures described for adapting the playout of the media data in step S203 prior to fully retrieving the current chunk in response to the result of the analysis in step S202 are the same as already described above in the context of FIG. 2 and will thus not be repeated.

Client Device

Figure 4:
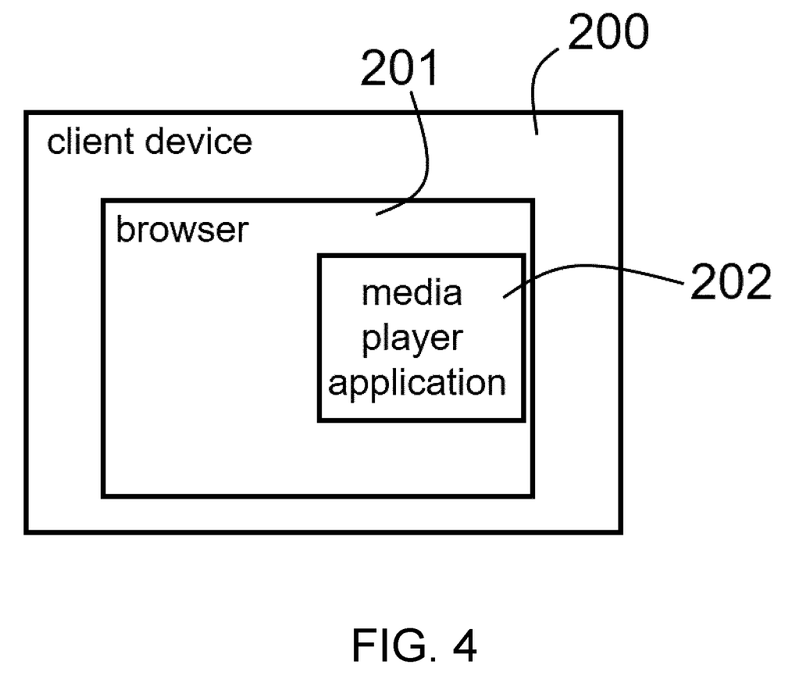
FIG. 4 illustrates an example of a client device having implemented a media player application.

Referring to FIG. 4, an example of a client device having implemented a media player application configured to perform a method for controlling media data playout on a client device is illustrated. A client device may, for example, include a personal computer (PC), a tablet PC, a laptop, a convertible, a Personal Digital Assistant (PDA), a smartphone, a smart TV or a smartwatch. In the embodiment illustrated in FIG. 4, the media player application, 202, is implemented on the client device, 200, by a web browser, 201. However, in an embodiment it may also be conceivable that the media player application may be implemented on the client device as a software. In both cases, the media player application may be configured to contain a play call to initiate a streaming process.

It is to be noted that the example of FIG. 4 represents merely a section of a streaming client device which focusses on the implementation of the media player application. It is, however, noted that a streaming client device may include one or more additional hardware and/or software components depending on respective use cases and setups that enable on demand and live streaming in general and in particular HTTP adaptive streaming. For example, the client device may further include in a non-limiting manner a jitter buffer and a media retrieval element for retrieving the media data as a consequence of the play call. The client device may also further include a user interface for presenting the media content to a user (consumer) and optionally for receiving input from the user and optionally one or more loudspeakers or loudspeaker/earphone ports. The streaming client device may further be able to access the internet by a wired and/or a wireless connection. Other additional hardware and/or software components are conceivable.

Figure 5:
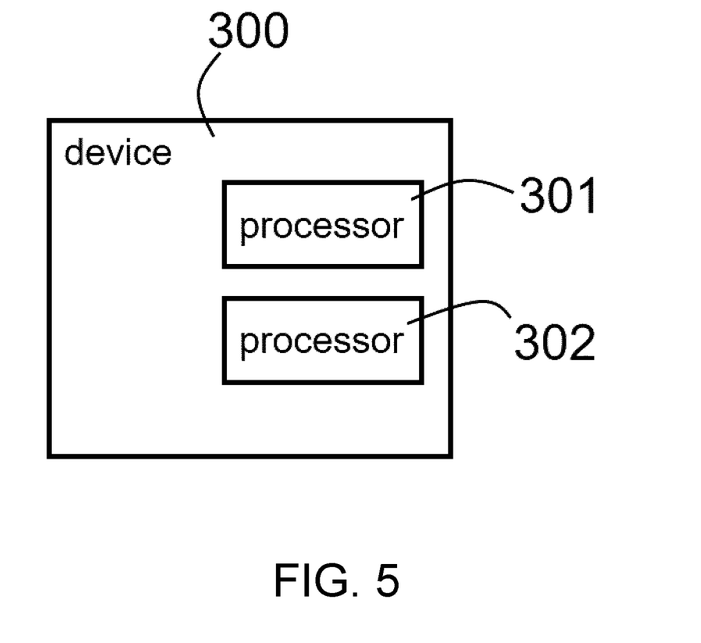
FIG. 5 illustrates an example of a device having processing capability.

It is further noted with reference to FIG. 5 that the methods described herein may further be implemented as a computer program product with instructions adapted to cause a device, 300, having processing capability, 301, 302, to carry out said methods.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

As stated above, the methods described herein may be implemented as a computer program product with instructions adapted to cause a device having processing capability to carry out said methods. Any processor capable of executing a set of instructions (sequential or otherwise) that specify actions to be taken are included. Thus, one example may be a typical processing system that may include one or more processors. Each processor may include one or more of a CPU, a graphics processing unit, tensor processing unit and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD), a light emitting diode display (LED) of any kind, for example, including OLED (organic light emitting diode) displays, or a cathode ray tube (CRT) display. If manual data entry is required, the processing system may also include an input device such as one or more of an alphanumeric input unit such as a keyboard, a pointing control device such as a mouse, and so forth. The processing system may also encompass a storage system such as a disk drive unit. The processing system may include a sound output device, for example one or more loudspeakers or earphone ports, and a network interface device.

A computer program product may, for example, be software. Software may be implemented in various ways. Software may be transmitted or received over a network via a network interface device or may be distributed via a carrier medium. A carrier medium may include but is not limited to, non-volatile media, volatile media, and transmission media. Non-volatile media may include, for example, optical, magnetic disks, and magneto-optical disks. Volatile media may include dynamic memory, such as main memory. Transmission media may include coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

Note that when the method to be carried out includes several elements, e.g., several steps, no ordering of such elements is implied, unless specifically stated otherwise.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an embodiment" means that a particular feature described in connection with the embodiment is included in at least one embodiment of the present disclosure. Thus, appearances of the phrases "in one embodiment", "in some embodiments" or "in an embodiment" in various places throughout this disclosure are not necessarily all referring to the same embodiment. Furthermore, the particular features may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim.

Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, device structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, steps may be added or deleted to methods described within the scope of the present disclosure.

Various aspects of the present invention may be appreciated from the following enumerated example embodiments (EEEs):

1. A method for controlling media data playout on a client device, wherein the method includes the steps of:
   (a) retrieving, by the client device, media data comprising a plurality of segments subdivided into one or more chunks for playout from at least one media server;
   (b) analyzing a current chunk of the one or more chunks of a current segment; and
   (c) adapting the playout of the media data in response to the result of the analysis prior to fully retrieving the current chunk.

2. Method according to EEE 1, wherein each of the one or more chunks comprises at least two IP packets, and wherein analyzing the current chunk in step (b) and adapting the playout of the media data in step (c) is performed prior to fully retrieving the at least two IP packets within the current chunk.

3. Method according to EEE 1 or 2, wherein analyzing the current chunk in step (b) includes analyzing a size of the current chunk.

4. Method according to EEE 3, wherein analyzing the size of the current chunk is performed by analyzing a header of the current chunk.

5. Method according to any of EEEs 2 to 4, wherein analyzing the current chunk in step (b) includes analyzing at least a first one of the at least two IP packets within the current chunk.

6. Method according to any of EEEs 1 to 5, wherein adapting the playout of the media data in step (c) is based on one or more playout conditions.

7. Method according to EEE 6, wherein the one or more playout conditions include one or more of network conditions indicative of a state of a network used for retrieving the media data and client conditions indicative of a state of the client device.

8. Method according to EEE 7, wherein the network conditions include an available network bandwidth.

9. Method according to EEE 7, wherein the client conditions include a state of a jitter buffer of the client device.

10. Method according to any of EEEs 1 to 9, wherein retrieving the media data for playout includes live streaming.

11. Method according to any of EEEs 1 to 10, wherein adapting the playout of the media data in step (c) includes adapting a media quality and/or a playout rate.

12. Method according to EEE 11, wherein adapting the playout rate includes increasing or decreasing a playout speed.

13. Method according to EEE 12, wherein the playout speed is increased if it is analyzed that the size of the current chunk is small and/or a latency of media data that are currently played out is above a given threshold.

14. Method according to EEE 12, wherein the playout speed is decreased if it is analyzed that the size of the current chunk is large and/or a latency of media data that are currently played out is below a given threshold.

15. Method according to any of EEEs 12 to 14, wherein the playout speed is increased or decreased by up to 20%.

16. Method according to EEE 11, wherein adapting the media quality includes changing a bitrate of a download process or streaming process for retrieving the media data.

17. A client device having implemented a media player application configured to perform the method according to any of EEEs 1 to 16.

18. Client device according to EEE 17, wherein the media player application is implemented on the client device by a web browser.

19. Client device according to EEE 17, wherein the media player application is implemented on the client device as a software.

20. Computer program product with instructions adapted to cause a device having processing capability to carry out the method according to any of EEEs 1 to 16.

The invention claimed is:

1. A method for controlling media data playout on a client device, wherein the method includes the steps of:
   (a) retrieving, by the client device and from at least one media server, media data comprising a plurality of segments subdivided into one or more common media application format (CMAF) chunks for playout, wherein each CMAF chunk includes one or more Internet Protocol (IP) packets; wherein the retrieving includes live streaming of the media data from the at least one media server to the client device;
   (b) analyzing, with the client device, a size of a current CMAF chunk of the one or more CMAF chunks of a current segment while the current CMAF chunk is being retrieved but has not yet been fully retrieved; and
   (c) adapting, with the client device, the playout of the media data in response to the result of the analysis, prior to fully retrieving the current CMAF chunk, wherein adapting the playout of the media data includes adapting a playout rate;

wherein adapting the playout rate includes:
increasing a playout speed by increasing a number of frames output by the client device per a time period during playout in response to determining that the size of the current CMAF chunk is small, and
decreasing the playout speed by decreasing the number of frames output by the client device per the time period during playout in response to determining that the size of the current CMAF chunk is large.

2. Method according to claim 1, wherein each of the one or more CMAF chunks comprises at least two IP packets, and wherein analyzing the current CMAF chunk in step (b) and adapting the playout of the media data in step (c) is performed prior to fully retrieving the at least two IP packets within the current CMAF chunk.

3. Method according to claim 1, wherein analyzing the size of the current CMAF chunk is performed by analyzing a header of the current CMAF chunk.

4. Method according to claim 2, wherein analyzing the current CMAF chunk in step (b) includes analyzing at least a first one of the at least two IP packets within the current CMAF chunk.

5. Method according to claim 1, wherein adapting the playout of the media data in step (c) is based on one or more playout conditions.

6. Method according to claim 5, wherein the one or more playout conditions include one or more of network conditions indicative of a state of a network used for retrieving the media data.

7. Method according to claim 6, wherein the network conditions include an available network bandwidth, and client conditions indicative of a state of the client device.

8. Method according to claim 7, wherein the client conditions include a state of a jitter buffer of the client device.

9. Method according to claim 1, wherein adapting the playout of the media data includes dynamically adapting a size of a jitter buffer of the client device depending on the size of the current CMAF chunk, wherein the jitter buffer is configured to receive the media data before the playout of the media data, wherein a state of the jitter buffer indicates an amount of media data currently stored in the jitter buffer, and wherein the size of the jitter buffer indicates a maximum amount of media data storable in the jitter buffer.

10. Method according to claim 1, wherein the playout speed is increased or decreased by up to 20%.

11. Method according to claim 1, wherein adapting the playout of the media data includes adapting a media quality, wherein adapting the media quality includes changing a bitrate of a download process or streaming process for retrieving the media data.

12. Method according to claim 1, used in Moving Pictures Expert Group Dynamic Adaptive Streaming over HyperText Transfer Protocol (MPEG DASH), or in HyperText Transfer Protocol (HTTP), transmission Control Protocol (TCP), or Internet Protocol (IP) streaming.

13. A client device containing at least one processor and memory, and having implemented a media player application configured to perform the method according to claim 1.

14. The client device according to claim 13, wherein the media player application is implemented on the client device by a web browser.

15. The client device according to claim 13, wherein the media player application is implemented on the client device as software.

16. A computer program product with instructions stored on a non-transitory computer-readable medium and configured to be executed by an electronic processor to cause a device having the electronic processor to carry out the method according to claim 1.

* * * * *